United States Patent Office 3,437,663
Patented Apr. 8, 1969

3,437,663
ADDITION REACTIONS OF AMINOACETYLENES
Heinz G. Viehe, Linkebeek, Belgium, assignor to Union Carbide Corporation, a corporation of New York
No Drawing. Continuation-in-part of application Ser. No. 376,253, June 18, 1964. This application Nov. 30, 1964, Ser. No. 414,852
Claims priority, application Germany, Dec. 27, 1963, E 26,131
Int. Cl. C07c 93/10, 87/24; C07d 29/12
U.S. Cl. 260—294.7         3 Claims

ABSTRACT OF THE DISCLOSURE

Aminoacetylenes are reacted with active hydrogen-containing compounds such as primary amines, alcohols, hydroxylamine, hydrazine and hydrogen halides to form addition products such as amidines, ketene-O,N-acetals, and the like. The addition products are useful as hydrogen halide acceptors, as sources for hydroxylamine and hydrazine, and as halogenation reagents.

---

This application is a continuation-in-part of application Ser. No. 376,253, filed June 18,1965, now U.S. Patent 3,340,246.

This invention relates to addition reactions. More particularly, the invention is directed to chemical reactions in which a chemical compound containing an active hydrogen atom adds to the triple bond of an aminoacetylene.

As used herein, the term "active hydrogen" means a hydrogen atom which is more easily dissociated from the atom to which it is bonded than is a hydrogen atom bonded to carbon in a hydrocarbon molecule. The term "addition reaction" as used herein, means the chemical reaction which takes place with the breaking of the bond between an active hydrogen atom and the moiety to which it is initially attached and the formation of new bonds (a) between the hydrogen atom and one carbon of the aminoacetylene triple bond, and (b) between the moiety originally carrying the active hydrogen atom and the other carbon atom of the aminoacetylene triple bond. Following this initial addition reaction, the aminoacetylene derivative may or may not undergo further rearrangement.

It has now been discovered that aminoacetylenes undergo a variety of addition reactions with compounds containing active hydrogen atoms with the production of a wide variety of novel chemical compounds. It is therefore an object of this invention to provide a process for adding compounds containing active hydrogen atoms to aminoacetylenes. A further object of the invention is to provide a process in which aminoacetylenes react with compounds containing active hydrogen atoms including alcohols, amines, hydrogen halides, hydroxyl amine and hydrazine. A still further object of the invention is to provide novel chemical compounds which are derivatives of aminoacetylenes.

According to the process of this invention, an aminoacetylene compound and a compound containing at least one active hydrogen atom are mixed together and maintained at a temperature sufficiently elevated to cause addition of the active hydrogen compound to the triple bond in the aminoacetylene.

The aminoacetylene compounds useful in the process of this invention are those represented by the formula (A) 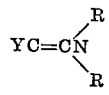

wherein R is a monovalent hydrocarbon group, Y is an R group, a hydrogen atom or an $NR_2$ group, and two R groups on the same nitrogen atom can together form a divalent alkylene group.

In the compounds of Formula A the various R groups can be the same or different throughout the same molecule, and the R groups preferably contain from 1 to about 18 carbon atoms.

The R groups in Formula A can be alkyl, aryl, alkaryl, aralkyl, alkenyl, alkynyl, cycloalkyl, cycloalkenyl, and the like groups. For example, R can be methyl, ethyl, n-butyl, tertiary-butyl, 2,2-dimethyl-n-propyl, iso-octyl, octadecyl, phenyl, phenylethyl, terphenyl, cumyl, mesityl, cyclopentyl, ethylcyclohexenyl, allyl, or butyne-2-yl groups, and the like, and two R groups on the same nitrogen atom can together be tetramethylene, 3-ethylhexamethylene, decamethylene, and the like.

Throughout the present specification and claims, $C_6H_5$, $C_6H_4$, $C_4H_9$, i-$C_4H_9$, and t-$C_4H_9$ represent respectively the phenyl, phenylene, normal butyl, isobutyl and tertiary butyl groups.

Typical compounds represented by Formula A are the following:

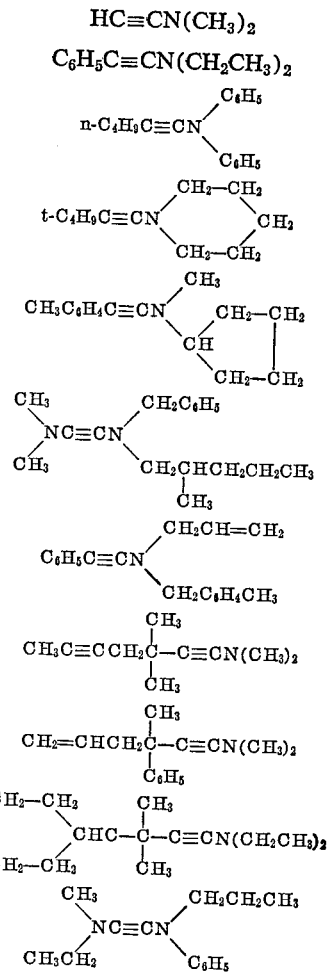

The compounds of Formula A can be prepared by the reaction of compounds represented by the following formulas (ii)     $R'—C≡CX$ (iii)     $R'—CH=C\begin{smallmatrix}F\\X\end{smallmatrix}$ (iv) 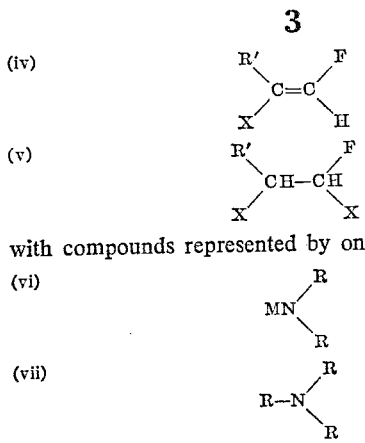

(v)

with compounds represented by one of the formulas (vi)
$$MN\begin{matrix}R\\R\end{matrix}$$

(vii)
$$R-N\begin{matrix}R\\R\end{matrix}$$

In Formulas ii, iii, iv, v, vi and vii, R has the meaning defined hereinabove with reference to Formula A, R' represents hydrogen or an R group, X represents a halogen, preferably fluorine, chlorine, or bromine, and M represents an alkali metal, namely, lithium, potassium, rubidium, cesium or francium.

The process for producing the compounds of Formula A comprises mixing together in a hydrocarbon, hydrocarbon ether or tertiary amine solvent a compound of Formula ii, iii, iv or v and a compound of Formula vi or vii, and maintaining the mixture at a temperature between about −25° C. and 150° C. until the compound of Formula A is produced. Preferably, the reactants are employed in the ratio of at least one mole of the compound of Formula vi or vii per gram atom of halogen in the compound of Formula ii, iii, iv, or v. A slight excess of the compound of Formula vi or vii over and above this ratio is often desirable. Preferably the reaction mixture is stirred during the course of the reaction.

It is preferable to carry out the reaction producing compounds of Formula A under anhydrous conditions and in the absence of oxygen. This can be conveniently done by carrying out the reaction under an atmosphere of inert gas, such as nitrogen, argon, helium, and the like.

Organic solvents useful in this process include hydrocarbons, hydrocarbon ethers, and tertiary amines represented by Formula vii hereinabove. Illustrative solvents include hydrocarbons such as petroleum ether, cyclohexane, 2-ethylhexane, benzene, toluene, xylene and the like, and ethers such as diethyl ether, di-isopropyl ether, methylbutyl ether, dioxane, tetrahydrofuran, ethylene glycol dimethyl ether, diethylene glycol dimethyl ether, and the like, and tertiary amines of Formula vii hereinabove.

Where highly volatile reactants, such as HC≡CF, t-C₄H₉CHBrCHBrF or CHF=CCl₂ are employed, it is preferable to form the reaction mixture at −80° C. or below and then warm the mixture to −20° C. to 25° C. where reaction will take place.

Where R' in Formula ii is hydrogen, the reaction of a compound of Formula ii with a compound of Formula vi first produces a compound having the formula MC≡CNR₂, which on treatment with an aliphatic alcohol gives the desired compound HC≡CNR₂.

Where a compound of Formula vii is used, it is convenient to use an excess of this compound as a solvent.

The process can also be carried out using a mixture of compounds of Formulas vi and vii, both of which will then react with the compound of Formula ii, iii, iv or v to yield compounds of Formula A. For example, the reaction of C₆H₅C≡CCl with a mixture of LiN(CH₃)₂ and N(CH₃)₃ gives primarily C₆H₅C≡CN(CH₃)₂, while the reaction of C₆H₅C≡CCl with a mixture of LiN(CH₂CH₃)₂ and N(CH₃)₃ gives a mixture of C₆H₅C≡CN(CH₃)₂ and C₆H₅C≡CN(CH₂CH₃)₂. The relatvie amounts of products in such product mixtures depend on the relative reactivities of the compounds of Formulas vi and vii. In such reactant mixtures, the compound of Formula vii is both a reactant and a solvent.

Where a compound of Formula vii is used, and the R groups are not all the same, the primary product will depend on which nitrogen-R group bond is most easily broken. It has been found, for example that a typical order of decreasing ease of R—N bond breaking is allyl-N, benzyl-N, methyl-N, ethyl-N, and n-propyl-N. Thus, the reaction of C₆H₅C≡CCl with

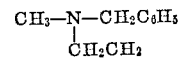

yields primarily

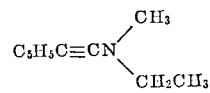

When the solvent is a hydrocarbon or hyrocarbon ether, the preferred reaction temperatures are −25° C. to 20° C., and when the solvent is a tertiary amine, higher temperatures up to 150° C. are preferred.

There is no particular advantage to be gained in carrying out the reaction at pressures other than atmospheric pressure. However, when a sealed reaction vessel is employed, the autogenous pressure of the reaction mixture at the reaction temperature is satisfactory.

Formation of the compound of Formula A in good yield generally takes from a few hours up to several days depending on the particular temperature, solvent and reactants.

The reaction product, a compound of Formula A, is separated from the reaction mixture by conventional methods which include separation of liquid from precipitated salts and other solids, and isolation of the desired product by evaporation of solvent, fractional distillation, and the like. Product separation is preferably carried out under an inert atmosphere.

Examples of producing compounds of Formula A (underlined) are the following:

(a) 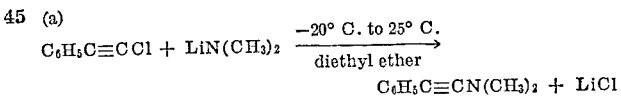

(b) 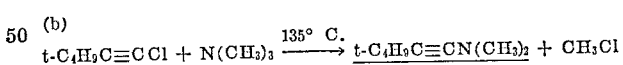

(c) 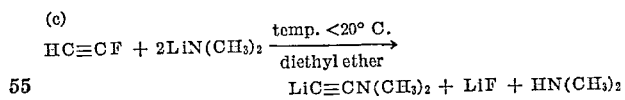

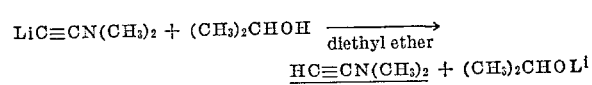

(d) 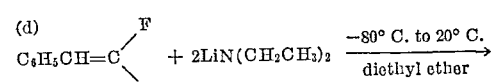

(e) 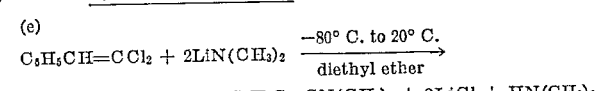

(f) 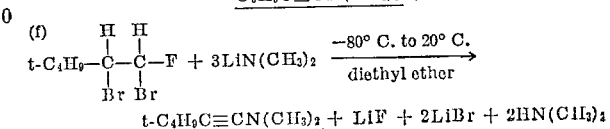

(g)

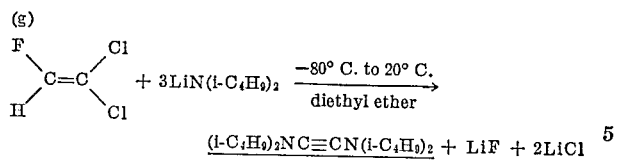

With further reference to the production of compounds of Formula A, compounds of the formula $R_2NC\equiv CNR_2$ can be produced by the reaction of a compound of the formula $HXC=CFX$ with a compound of Formula vi. The reaction mixture is preferably formed at $-80°$ C. or below and the reaction takes place on warming to room temperature. This process is illustrated by Equation g hereinabove. Where a mixture of compounds of Formula vi is employed, compounds of the formula $R_2NC\equiv CNR_2$ are produced wherein the two $R_2N$ groups are different.

Typical compounds useful in the process of this invention which contain active hydrogen atoms include hydrogen halides and compounds in which a hydrogen atom is bonded to oxygen, nitrogen, sulfur, phosphorus, and the like. A preferred group of active hydrogen compounds for use in the process of this invention is those represented by the formulas (B)  ROH
(C)  GNH$_2$
and
(D)  HX wherein R has the meaning defined hereinabove with reference to Formula A; G is an R group, a hydroxyl group OH, or a primary amine group NH$_2$; and X is a halogen, namely, fluorine, chlorine, bromine, iodine or astatine.

Typical compounds represented by Formula B are methanol, ethanol, t-butanol, 2-ethyl-6-hexanol, octadecanol, phenol, m-cresol, benzyl alcohol, allyl alcohol, cyclohexanol, propargyl alcohol, beta-phenylethanol, and the like.

Typical compounds represented by Formula C are methyl amine, ethyl amine, t-butyl amine, 2-aminoheptane, octadecyl amine, aniline, p-ethylaniline, beta-phenylethyl amine, allyl amine, 1-amino-3-butyne, cycloheptyl amine, and the like.

The compounds of Formulas B and C, and the hydrogen halides of Formula D are well known and can be prepared by conventional methods.

The process of this invention can be used to produce a wide variety of new and useful chemical compounds, for example, the reaction of a compound of Formula A with a compound of Formula B (ROH) produces compounds having the formula (E)

wherein Y and R have the meanings defined hereinabove. Typical compounds represented by Formula E are the following:

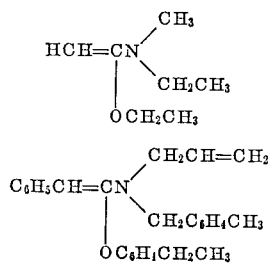

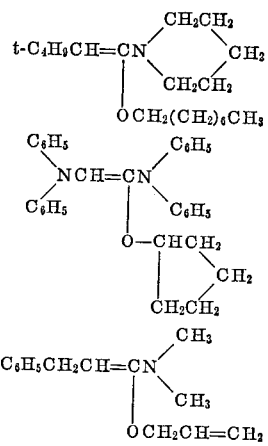

The reaction of compounds of Formula A with compounds of the formula $RNH_2$ produces compounds represented by the formula (F)

wherein Y and R have the meanings defined hereinabove. Illustrative compounds represented by Formula F are the following:

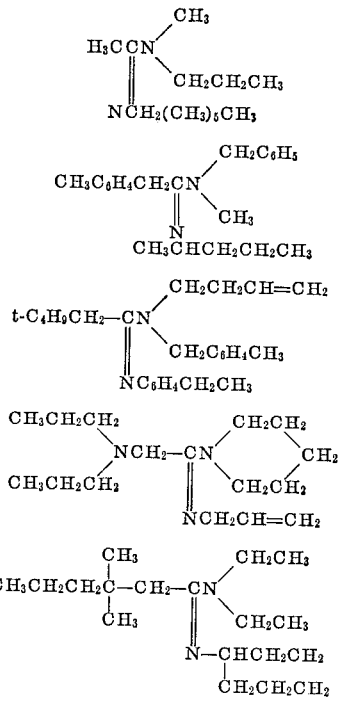

Compounds of Formula E and Formula F react with hydrogen halides and are therefore useful under anhydrous conditions as hydrogen halide acceptors. For example, all of the compounds of Formulas E and F can be used as hydrogen halide acceptors in the process for producing cyclopentadienyl metal compounds described in Morehouse, U.S. Patent 3,071,605, issued Jan. 1, 1963.

The reaction of compounds of Formula A with hydroxylamine produces compounds represented by the formula (G)

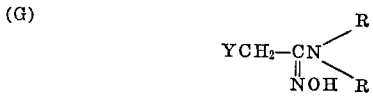

wherein Y and R have the meanings defined hereinabove. Illustrative compounds of Formula G are the following

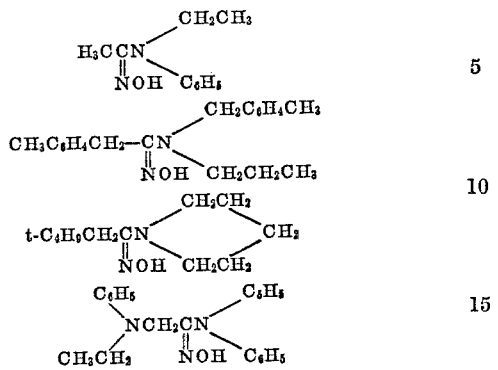

Compounds of Formula G are useful as sources of hydroxyl amine for use in chemical reactions. Compounds of Formula G hydrolyze readily to release hydroxylamine and amides of the formula

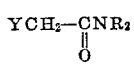

The reaction of compounds of Formula A with hydrazine produces compounds represented by the formula (H) 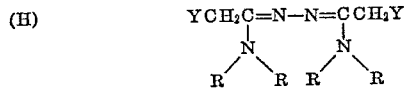

wherein Y and R have the meanings defined hereinabove. Illustrative compounds of Formula H are the following:

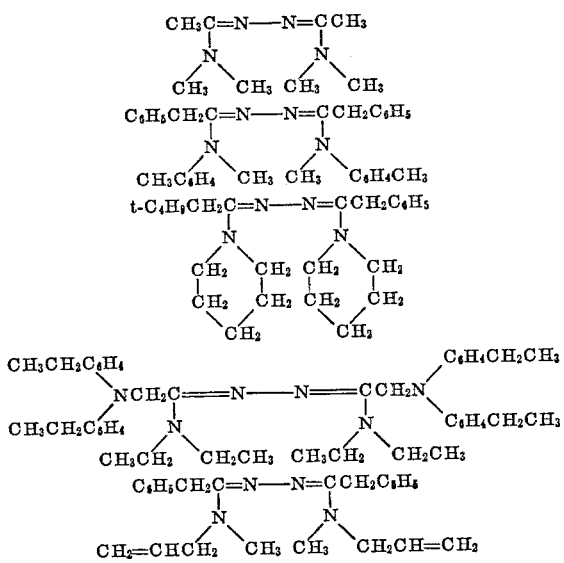

Compounds of Formula H are useful as sources of hydrazine for use in chemical reactions. Compounds of Formula H hydrolyze readily to release hydrazine and amides of the formula

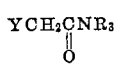

The reaction of compounds of Formula A with hydrogen halides (compounds of Formula D) produces compounds represented by the formula (I) 

wherein Y, R and X have the meanings defined hereinabove. Illustrative compounds of Formula I are the following

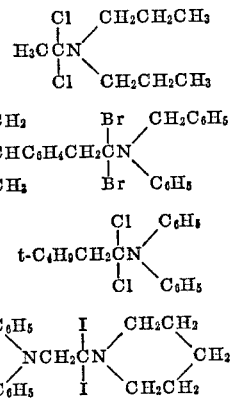

Compounds of Formula I are useful as halogenation reagents in the production of hydrocarbon halides from alcohols and the production of acid halides from acids. For example, a compound of Formula I reacts with an alcohol ROH to produce the hydrocarbon halide RX plus the by-products HX and amides of the formula

The process of the present invention can be carried out with or without a solvent. However, an inert organic solvent is preferred. Suitable inert solvents include hydrocarbons, halogenated hydrocarbons, and hydrocarbon ethers, for example, hydrocarbons such as petroleum ether, cyclohexane, 2-ethylhexane, benzene, toluene, xylene and the like, and ethers such as diethyl ether, diisopropyl ether, methylbutyl ether, dioxane, tetrahydrofuran, ethylene glycol dimethyl ether, diethylene glycol dimethyl ether, and the like, and halogenated hydrocarbons such as methylene chloride, trichloroethane, chlorobenzene, bromobenzene and the like.

The temperatures at which the process of this invenion is carried out can vary widely depending upon the particular reactants, and the proper choice of temperature is illustrated by the examples hereinbelow. Usually temperatures from about −20° C. up to about 100° C., and preferably from room temperature up to about 50° C., are satisfactory, except in the case of reactions with hydrogen halides where initial temperatures of −80° C. or below are preferred. When a solvent is employed, the boiling point of the solvent is often a convenient elevated temperature.

There is no particular advantage to be gained in carrying out the process of this invention at pressures other than atmospheric pressure. However, when a sealed reaction vessel is employed, the autogenous pressure of the reaction mixture at the reaction temperature is satisfactory.

Although not absolutely necessary, it is preferable to employ trace amounts of mineral acid as a catalyst for the addition reaction of the process of this invention. Suitable catalysts include hydrochloric acid, hydrobromic acid, sulfuric acid, and the like. When the active hydrogen compound employed in the process of this invention is a hydrogen halide, no separate additional catalyst is required.

Since aminoacetylenes react readily with water, it is preferable to carry out the process of this invention under anhydrous conditions. This may be conveniently done by carrying out the process of this invention under an atmosphere of inert gas such as nitrogen, helium, argon, and the like.

The addition reaction of the process of this invention takes place in good yield in reaction times of from a few minutes up to several days depending on the particular temperature, solvent, presence or absence of catalyst, the particular reactants, and the like.

The products produced by the process of this invention can be separated from the reaction mixture by conventional methods including separation of liquid products from solid matter, the isolation of the desired product by evaporation of solvent, fractional distillation, and the like. Several methods of product recovery are illustrated in the examples hereinbelow.

The ratio of reactants in the process of this invention is not critical. However, it is frequently preferable to employ the active hydrogen-containing compound in amounts which correspond to either one or two gram atoms of active hydrogen per gram mole of aminoacetylene. For example, in preparation of compounds of Formula E, it is preferable to employ one gram mole of ROH per gram mole of aminoacetylene, while in production of compounds of Formula I, it is preferable to employ two gram moles of hydrogen halide per gram mole of aminoacetylene.

In some instances the compounds produced by the process of this invention undergo a rearrangement following the initial addition reaction. For example, the compounds of Formula I rearrange to form an equilibrium mixture of

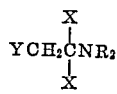

and Y $$[CH_2C=NR_2]^+X^-$$
$$\phantom{[CH_2C=NR_2]^+}X$$

the equilibrium favoring the salt form.

Also compounds produced by the addition of two moles of ROH to a compound of Formula A rearrange to form an equilibrium mixture of

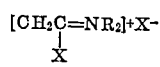

and $$[YCH_2C=NR_2]^+OR^-$$
$$\phantom{[YCH_2C=NR_2]^+}OR$$

the equilibrium concentration of the salt-like form being extremely small.

In some instances the compounds produced by the process of this invention react with a strong base to regenerate the compound of Formula A. For example, the compounds of Formula I (equilibrium mixture) react with compounds of Formula VI according to the equation

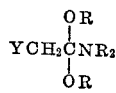

The reaction is conveniently carried out by mixing the compounds of Formulas I and vi, preferably in an inert organic solvent of the classes described hereinabove, at a temperature below about −25° C. (preferably at −80° C.), and then maintaining the reaction mixture at a temperature between about −25° C. and 50° C. until the compound of Formula A is produced. This reaction is further illustrated in the examples hereinbelow.

The active hydrogen containing compounds useful in the process of this invention can contain more than one site which is reactive in the process of this invention. For example, hydrazine contains two H₂N— groups, both of which are reactive sites in the process of this invention. Other examples are glycols, triols, diamines, dithiols, and the like.

Other classes of active hydrogen compounds which are useful in the process of this invention include hydrogen cyanide, ammonia, hydrogen sulfide and compounds having the formulas (J)   RSH
(K)   $RN\!-\!CR$
       $\ \ H\ \ \ \|$
       $\ \ \ \ \ \ \ O$
(L)   HOR″OH
(M)   H₂NR″NH₂
(N)   HSR″SH and (O)   R₂NH wherein R has the meaning defined hereinabove and R″ is a divalent hydrocarbon group such as ethylene, 1,2-propylene, 1,4-butylene, 1,4-cyclohexylene, para-phenylene and the like.

Other reactions which further illustrate the process of this invention are the following:

(h)
$$C_6H_5C\equiv CN(CH_3)_2 + CH_3CH_2SH \longrightarrow C_6H_5CH=CN(CH_3)_2$$
$$\phantom{C_6H_5C\equiv CN(CH_3)_2 + CH_3CH_2SH \longrightarrow C_6H_5CH=}SCH_2CH_3$$

(i)
$$(CH_3CH_2)_2NC\equiv CN(CH_2CH_3)_2 + H_2N(CH_2)_6NH_2 \longrightarrow$$
$$(CH_3CH_2)_2NCH_2C=N(CH_2)_6N=CCH_2N(CH_2CH_3)_2$$
$$\phantom{xxxxxxxxxxx}N(CH_2CH_3)_2\ \ \ N(CH_2CH_3)_2$$

(j)
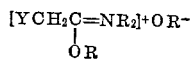

(k)   $HC\equiv CN(C_6H_5)_2 + C_6H_5PH_2 \longrightarrow H_3CCN(C_6H_5)_2$
       $\phantom{xxxxxxxxxxxxxxxxxxxxxxxxxxxxxxxxxx}\|$
       $\phantom{xxxxxxxxxxxxxxxxxxxxxxxxxxxxxxxxx}PC_6H_5$ The following examples further illustrate the process and compounds of this invention.

EXAMPLE 1

A mixture containing 0.005 mole of 1-phenyl-2-dimethylaminoacetylene and ethanol in 5 ml. diethyl ether was kept overnight at room temperature. A trace of anhydrous HCl was used as a catalyst. The solvent was then evaporated and the residue distilled at 110° C./0.005 mm./Hg to yield beta-dimethylamino-beta-ethoxystyrene. A field ionization mass spectroscopic determination of molecular weight yielded the theoretical value. To further prove the structure, the product beta-dimethylamino-beta-ethoxystyrene was hydrolyzed at room temperature with 6 normal HCl to yield ethyl-alpha-phenyl-acetate and the coproduct dimethylamine.

EXAMPLE 2

Into a solution of 0.59 g. of 1-phenyl-2-dimethylaminoacetylene in 50 ml. of n-hexane was introduced a stream of dry HCl at −80° C. A white solid precipitated. The product (2-phenyl-1,1-dichloroethyl) dimethylamine was analyzed for chlorine: Calculated for C₁₀H₁₃Cl₂N: Cl, 32.5%. Found: Cl, 31.7%.

EXAMPLE 3

N,N,N′,N′-tetraethyldiaminoacetylene (0.841 g.=0.005 mole) and aniline (0.416 g.=0.005 mole) were dissolved in 15 ml. diethyl ether. When 0.8 ml. of a 0.665 normal solution of HCl in diethyl ether was added a small amount of aniline hydrochloride precipitated. The solvent was evaporated from the ethereal solution and the residue distilled under 0.002 mm./Hg. At 115° C. 1.1 g. of the N-phenylamidine of N,N-diethyl-alpha-(diethylamino)-acetamide was obtained which is redistilled at 110° C./0.002 mm. Hg. Yield: 80%.

*Analysis.*—Calc. for C₁₆H₂₇N₃; M=261.40: C, 73.51; H, 10.41; N, 16.08. Found: C, 72.61; H, 10.25; N, 15.40. M.W.: 261 (determined by field ionization mass spectrometry).

EXAMPLE 4

Following the general procedures of Example 3, the process of this invention was used to produce the following N-trisubstituted amidines:

| Aminoacetylene reactant | Primary amine reactant | Amidine product |
|---|---|---|
| $C_6H_5C\equiv CN(CH_3)_2$ | $C_6H_5NH_2$ | $C_6H_5CH_2CN(CH_3)_2$<br>$\parallel$<br>$NC_6H_5$ |
| $t\text{-}C_4H_9C\equiv CN(CH_3)_2$ | $C_6H_5NH_2$ | $t\text{-}C_4H_9CH_2CN(CH_3)_2$<br>$\parallel$<br>$NC_6H_5$ |
| $t\text{-}C_4H_9C\equiv CN(CH_3)_2$ | Alpha-naphthylamine | $t\text{-}C_4H_9CH_2CN(CH_3)_2$<br>$\parallel$<br>$N\text{(alpha-naphthyl)}$ |
| $(CH_3)_2NC\equiv CN(CH_2CH_3)_2$ | $C_6H_5NH_2$ | $(CH_3)_2CH_2CN(CH_2CH_3)_2$<br>$\parallel$<br>$NC_6H_5$ |

EXAMPLE 5

Hydroxylamine was prepared by dissolving (with stirring) 0.8 gram (0.015 mole) of finely ground hydroxylamine hydrochloride in a mixture of 30 ml. chloroform and 5 ml. triethylamine. Diethyl ether was then added to precipitate diethylamine hydrochloride which was separated, leaving hydroxylamine in solution. Next, 1.45 grams (0.01 mole) of 1-phenyl-2-dimethylaminoacetylene were added to the hydroxylamine solution. The solvents were immediately evaporated under vacuum at room temperature and the residue was recrystallized from ethanol to give the amidoxime

melting point 146°–147° C.

*Analysis.*—Calc. for $C_{10}H_{14}ON_2$: C, 67.39; H, 7.91; N, 15.71. Found: C, 67.35; H, 7.90; N, 15.60.

EXAMPLE 6

Following the general procedures of Example 5, 1-t-butyl-2-dimethylaminoacetylene and hydroxylamine reacted to give the amidoxime

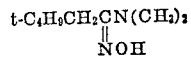

melting point 114° C. (from petroleum ether), in 73% yield.

*Analysis.* Calc. for $C_7H_{18}ON_2$: C, 60.73; H, 11.47; N, 17.71. Found C, 60.72; H, 16.41; N, 17.2.

EXAMPLE 7

A mixture of hydrazine (0.005 mole) and 1-phenyl-2-dimethylaminoacetylene (0.011 mole) in 10 ml. acetonitrile was maintained at room temperature for one week, during which time the amidhydrazone product

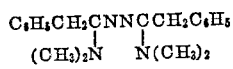

crystallized slowly from solution. The product, recrystallized from acetonitrile, had a melting point of 147°–148° C. and gave the following analysis (molecular weight by osmometry): Calc. for $C_{20}H_{26}N_4$: C, 74.50; H, 8.13; N, 17.38; M.W., 322.4. Found: C, 74.55; H, 8.06; N, 17.45; M.W. 330.

EXAMPLE 8

A solution of 1-t-butyl-2-dimethylaminoacetylene (0.005 mole) in 10 ml. of acetonitrile was added to a solution of 2,4-dinitrophenylhydrazone (0.0055 mole) in 50 ml. of acetonitrile at room temperature. The resulting red solution was concentrated by evaporating part of the solvent under vacuum at room temperature. The amidhydrazone product

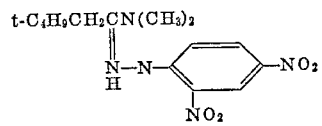

crystallized from the concentrated solution at room temperature. The product, recrystallized from acetonitrile, had a melting point of 190° C. and gave the following analysis (molecular weight by osmometry): Calc. for $C_{14}H_{21}O_4N_5$: C, 52.02; H, 6.36; N, 21.66; M.W. 323.35. Found: C, 52.05; H, 6.58; N, 21.40; M.W. 317.

EXAMPLE 9

Lithium diethylamide was added to a suspension of the (2-phenyl-1,1-dichloroethyl) dimethylamine [the product of Example 2] in diethyl ether at −80° C. The solid material dissolved on warming the mixture to room temperature. The solvent was evaporated and 1-phenyl-2-dimethylacetylene was recovered from the residue.

What is claimed is:

1. The process which consists essentially of (1) mixing together (a) an aminoacetylene represented by the formula $YC\equiv CNR_2$ wherein R is a monovalent hydrocarbon group containing from one to about 18 carbon atoms, Y is selected from the class consisting of R groups, hydrogen and $NR_2$ groups, and two R groups on the same nitrogen atom can together form an alkylene group, and (b) a compound represented by the formula ROH, wherein R has the meaning defined hereinabove, and (2) maintaining said mixture at a temperature sufficiently elevated to cause reaction of said compounds with the formation of a compound represented by the formula

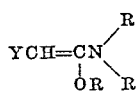

wherein Y and R have the meanings defined hereinabove.

2. The process of claim 1 wherein the compound represented by the formula ROH is a member of the group consisting of methanol, ethanol, t-butanol, 2-ethyl-6-hexanol, octadecanol, phenol, m-cresol, benzyl alcohol, allyl alcohol, cyclohexanol, propargyl alcohol, and beta-phenylethanol.

3. The process of claim 1 wherein said process is carried out in the presence of a catalytic quantity of a mineral acid.

(References on following page)

References Cited

UNITED STATES PATENTS

| | | |
|---|---|---|
| 2,119,802 | 6/1938 | Westphal et al. _____ 260—584 |
| 3,277,084 | 10/1966 | Martin _____ 260—570.6 XR |
| 2,211,280 | 8/1940 | Martin et al. _____ 260—564 |
| 2,558,875 | 7/1951 | Pearson _____ 260—583 XR |
| 2,969,395 | 1/1961 | Nedwick et al. _____ 260—584 |
| 3,008,998 | 11/1961 | Haszeldine _____ 260—583 XR |
| 3,179,668 | 4/1965 | Von Schickh et al. 260—564 XR |

FOREIGN PATENTS

| | | |
|---|---|---|
| 540,870 | 9/1955 | Belgium. |
| 631,292 | 11/1963 | Belgium. |
| 1,078,568 | 1/1960 | Germany. |
| 577,478 | 5/1946 | Great Britain. |

OTHER REFERENCES

Bachman et al.: Index Chemicus, vol. 15, p. 46413 (1964).

Bredereck et al.: Ber, Deut. Chem., vol. 97, pp. 3081–3087 (1964).

McElvain et al.: J. Am. Chem. Soc., vol. 67, pp. 202–204 (1945).

Viehe, Angew, Chem., vol. 76, pp. 571–572 (1964).

Wolf et al.: Ann. der Chem., vol. 638, pp. 33–42 (1960).

Zinner et al.: Angew Chem., vol. 76, p. 440 (1964).

FLOYD D. HIGEL, *Primary Examiner.*

U.S. Cl. X.R.

260—583, 563, 570.8, 584, 570.7, 570.5, 570.9, 564, 566, 260—294, 558, 561, 562, 296, 293, 649, 652, 544; 23—190